United States Patent
Takashima et al.

(10) Patent No.: US 9,432,283 B2
(45) Date of Patent: Aug. 30, 2016

(54) COMMUNICATION CONTROL SYSTEM AND COMMUNICATION CONTROL METHOD

(75) Inventors: Masanori Takashima, Tokyo (JP); Youichi Hidaka, Tokyo (JP); Tetsu Izawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1090 days.

(21) Appl. No.: 13/520,773

(22) PCT Filed: Jan. 4, 2011

(86) PCT No.: PCT/JP2011/050019
§ 371 (c)(1),
(2), (4) Date: Nov. 1, 2012

(87) PCT Pub. No.: WO2011/083786
PCT Pub. Date: Jul. 14, 2011

(65) Prior Publication Data
US 2013/0046882 A1    Feb. 21, 2013

(30) Foreign Application Priority Data
Jan. 6, 2010    (JP) .................... 2010-001292

(51) Int. Cl.
*G06F 15/173*    (2006.01)
*H04L 12/717*   (2013.01)
(Continued)

(52) U.S. Cl.
CPC ............ *H04L 45/42* (2013.01); *H04L 45/48* (2013.01); *H04L 45/54* (2013.01)

(58) Field of Classification Search
USPC .................. 709/224, 220, 223, 221, 245
See application file for complete search history.

(56) References Cited

U.S. PATENT DOCUMENTS

2004/0249803 A1*  12/2004  Vankatachary ......... H04L 45/00
2006/0092857 A1    5/2006  Ansari et al.
(Continued)

FOREIGN PATENT DOCUMENTS

CN    1466340 A    1/2004
CN    1770743 A    5/2006
(Continued)

OTHER PUBLICATIONS

OpenFlow Switch Specification Version 0. 9. 0 (Wire Protocol 0x98) Jul. 20, 2009 Current Maintainer: Brandon Heller (brandonh@standford.edu) <http://www.openflowswitch.org/documents/openflow-spec-v0.9.0.pdf>.
(Continued)

*Primary Examiner* — Lan-Dai T Truong
(74) *Attorney, Agent, or Firm* — McGinn IP Law Group PLLC (57) ABSTRACT

In the case of a system where a communication device is remote-controlled from a control server, depending on timing when an entry is written into a forwarding table of the communication device from the control server, there is a possibility that a loop and discard of the traffic occur. Therefore, for registration, rewriting and deletion of the entry of the forwarding table which are performed on the communication device 102 by the control server 101; the communication device 102 verifies contents of control instructions from the control server 101; the communication device 102 holds the result of this verification; the control server 101 acquires the result of the verification; the control server 101 judges whether or not a series of controls can be executed based on the results of the verification from the plurality of communication devices 102; and then the control server 101 invokes the execution at the plurality of communication devices 102.

12 Claims, 9 Drawing Sheets

(51) Int. Cl.
  *H04L 12/753*   (2013.01)
  *H04L 12/741*   (2013.01)

(56) References Cited

U.S. PATENT DOCUMENTS

| | | | |
|---|---|---|---|
| 2006/0092974 A1 | 5/2006 | Lakshman et al. | |
| 2006/0092976 A1 | 5/2006 | Lakshman et al. | |
| 2008/0137678 A1 | 6/2008 | Noguchi | |
| 2009/0296588 A1 | 12/2009 | Nishi et al. | |
| 2010/0037293 A1 | 2/2010 | Stjohns et al. | |
| 2010/0165920 A1 | 7/2010 | Chen | |
| 2010/0220632 A1* | 9/2010 | Javaid | H04L 45/302 370/255 |
| 2011/0078657 A1* | 3/2011 | Okada | G06F 11/1438 717/116 |

FOREIGN PATENT DOCUMENTS

| | | |
|---|---|---|
| CN | 1783880 A | 6/2006 |
| JP | 11-103318 A | 4/1999 |
| JP | 2000-286921 A | 10/2000 |
| JP | 2001-167125 A | 6/2001 |
| JP | 2002-176433 A | 6/2002 |
| JP | 2004-304523 A | 10/2004 |
| JP | 2004-336427 A | 11/2004 |
| JP | 2006-135970 A1 | 5/2006 |
| JP | 2007-142609 A | 6/2007 |
| JP | 2007-184696 A | 7/2007 |
| JP | 2007-184969 A | 7/2007 |
| JP | 2008-079175 A | 4/2008 |
| JP | 2009-232053 A | 10/2009 |
| KR | 10 0907136 B1 | 7/2009 |
| TW | 201008309 A | 2/2010 |
| TW | 201025940 A | 7/2010 |
| WO | 2008/126179 A1 | 10/2008 |

OTHER PUBLICATIONS

Russian Office Action dated Oct. 11, 2013, with English translation.
S. Halabi et al.,"Internet Routing Principles", $2^{nd}$ edition, Moscow, Publishing House "Williams", 2001.
Open Networking Foundation, "OpenFlow Switch Specification," Version 1.0.0 (Wire Protocol 0x01) , Dec. 31, 2009.
Chinese Office Action dated Mar. 18, 2014 with English translation.
Japanese Office Action dated Jun. 10, 2014 with a partial English translation.
Notification of Reason for Refusal (Japan) with English translation dated Jun. 4, 2013.
Notification of Reason for Refusal (Japan) with English translation dated Sep. 18, 2013.

* cited by examiner

| ENTRY NUMBER | TRANSMISSION SOURCE IP ADDRESS | TRANSMISSION DESTINATION IP ADDRESSES | OUTPUT PORT |
|---|---|---|---|
| N | 192.168.0.0/8 | 10.20.30.40/32 | OUTPUT PORT1027A |
| N-1 | 10.20.30.0/24 | 192.168.0.0/16 | OUTPUT PORT1027B |
| M | — | — | — |
| 2 | 192.168.1.0/16 | 10.10.10.0/16 | OUTPUT PORT1027A |
| 1 | 10.10.10.10/32 | 192.168.0.0/8 | OUTPUT PORT1027B |

Fig. 5

| CONTROLLER ID | TRANSACTION NUMBER | CONTROL CONTENT | STATE | ROLLBACK METHOD |
|---|---|---|---|---|
| 1 | 100 | FLOW REGISTRATION | SUCCESS : STANDBY | ROLLBACK FUNCTION A |
| 1 | 101 | FLOW REGISTRATION | CONFLICT : STANDBY | ROLLBACK FUNCTION B |
| 1 | 102 | FLOW REGISTRATION | IN THE PROCESS OF VERIFYICATION | — |
| 1 | 103 | FLOW REGISTRATION | WAITING FOR VERIFICATION | — |

| CONTROLLER ID | TRANSACTION NUMBER | CONTROL CONTENT | STATE | ROLLBACK METHOD |
|---|---|---|---|---|
| 1 | 100 | FLOW REGISTRATION | SUCCESS COMPLETION | ROLLBACK FUNCTION A |
| 1 | 101 | FLOW REGISTRATION | CONFLICT, COMPLETION | ROLLBACK FUNCTION B |
| 1 | 102 | FLOW REGISTRATION | NO ENTRY / COMPLETION | ROLLBACK FUNCTION C |
| 2 | 567 | FLOW REGISTRATION | CONFLICT / STANDBY | — |
| 1 | 103 | FLOW REGISTRATION | WAITING FOR VERIFICATION | — |

COMMUNICATION CONTROL SYSTEM AND COMMUNICATION CONTROL METHOD

TECHNICAL FIELD

The present invention relates to a communication control system, and more specifically to a communication control system separately having a communication device forwarding packets and a control server determining route information.

BACKGROUND ART

For network route control in TCP/IP (Transmission Control Protocol/Internet Protocol) or IEEE802.1, a method is typical in which autonomous route control is performed by route information exchange between communication devices.

On the other hand, in the autonomous route control between the communication devices, temporary inconsistency in the route information between the communication devices occurs, which brings about a problem of deterioration of network reliability.

As a method of addressing this problem, Patent Literature 1 (US 2006/0092974 A1) discloses a method of separating a control portion from a communication device and remotely controlling, by a control server having this control part mounted thereon, a plurality of communication devices having no control portion. Also it is known that by controlling routes of the plurality of communication devices by the control server, as compared with the autonomous route control in which route information is exchanged between the plurality of communication devices, route control with high reliability can be realized.

In addition, Non-Patent Literature 1 discloses the OpenFlow Protocol as a protocol that controls a communication device from a control server. According to the OpenFlow Protocol, the communication device has a forwarding table called a flow table, and the control server can add, rewrite and delete an entry to or from the forwarding table of the communication device.

The flow table is a table in which an entry defining a predetermined processing (action) to be performed on a packet matching a predetermined match condition (rule) is registered. A packet group (packet line) matching the rule is called a flow. The rule of the flow is defined by various combinations using any or all of a destination address, a source address, a destination port and a source port which are included in a header region of each protocol hierarchy of the packet, and is identifiable. The addresses described above include a MAC address (media access control address) and an IP address (Internet Protocol Address) Moreover, in addition to those described above, ingress port information can also be used as the rule of the flow.

Moreover, the communication device, for predetermined search information, performs matching of a traffic going through the communication device and an entry registered in a forwarding table, and when the pieces of search information (for example, destination IP addresses) included in the both match each other, forwards the traffic to a route in accordance with the entry. It is possible to perform the network route control from the control server by using, for example, the Open Flow Protocol.

In the case where the remote control of the communication device from the control server is performed, by using a well-known method, it is possible to suppress oscillation of route information caused due to change of the communication device. However, depending on timing when an entry is written into the forwarding table of the communication device from the control server, there is a possibility that a loop and discard of the traffic occur.

For example, the case where an entry is written into a forwarding table of a given communication device regardless of a forwarding route calculated by a control server will be described.

Figure 1:
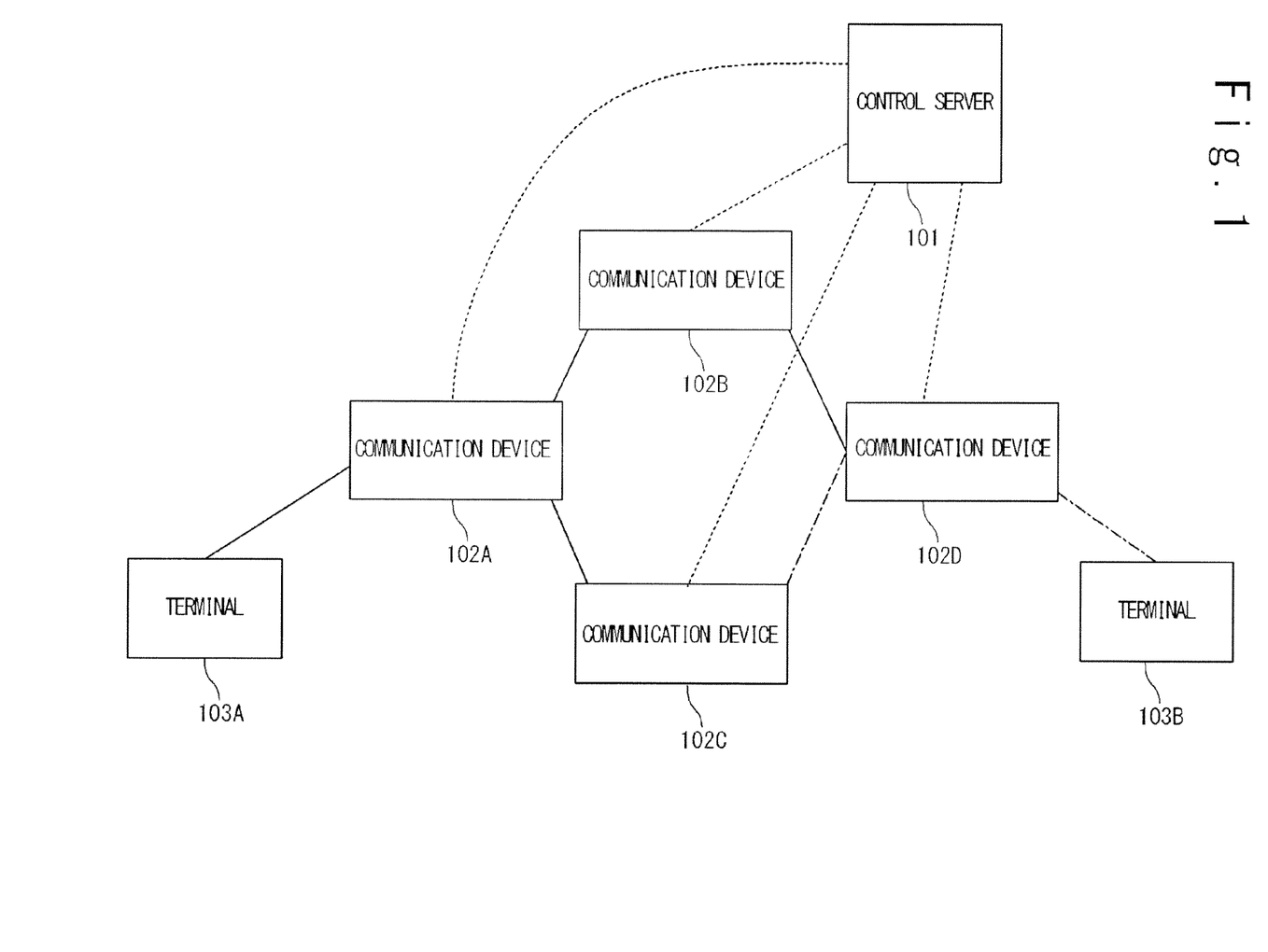
FIG. 1 is a diagram showing a configuration example of a network.

Referring to FIG. 1 as an example, in the case where, in a communication device 102A, when a certain entry of the forwarding table has been registered with its output destination defined as a communication device 102B as search information, and in the communication device 102B, an entry of the forwarding table containing this search information has already been registered with its output destination defined as the communication device 102A, then the traffic matching the condition is repeatedly reciprocated between the communication device 102A and the communication device 102B.

For example, assume that, in the communication device 102A, as search information, an entry has been registered which defines that an output destination of a packet having as header information a destination IP address "192.168.0.1/32" ("/32" denotes a network address length) is the communication device 102B. At this point, in the case where, in the communication device 102B, an entry has already been registered which defines that an output destination of a packet having as header information a destination IP address "192.168.0.0/8" is the communication device 102A, then a traffic destined to the IP address "192.168.0.1/32" is repeatedly reciprocated between the communication device 102A and the communication device 102B.

Moreover, for example, the case where an entry is written into a forwarding table of an arbitrary communication device 102 regardless of a forwarding route calculated by the control server will be described.

Referring to FIG. 1 as an example, in the case where, after a certain entry of a forwarding table is registered with its output destination defined as the communication device 102B in the communication device 102A, a new entry of a forwarding table cannot be registered in the communication device 102B, then a traffic matching the condition is discarded in the communication device 102B.

For example, in the case where, after an entry which defines an output destination of a packet having as header information as search information the destination IP address "192.168.0.1/32" is the communication device 102B has been registered in the communication device 102A, a new entry of a forwarding table cannot be registered in the communication device 102B, then a traffic destined to the IP address "192.168.0.1/32" is discarded in the communication device 102B.

Figure 3:
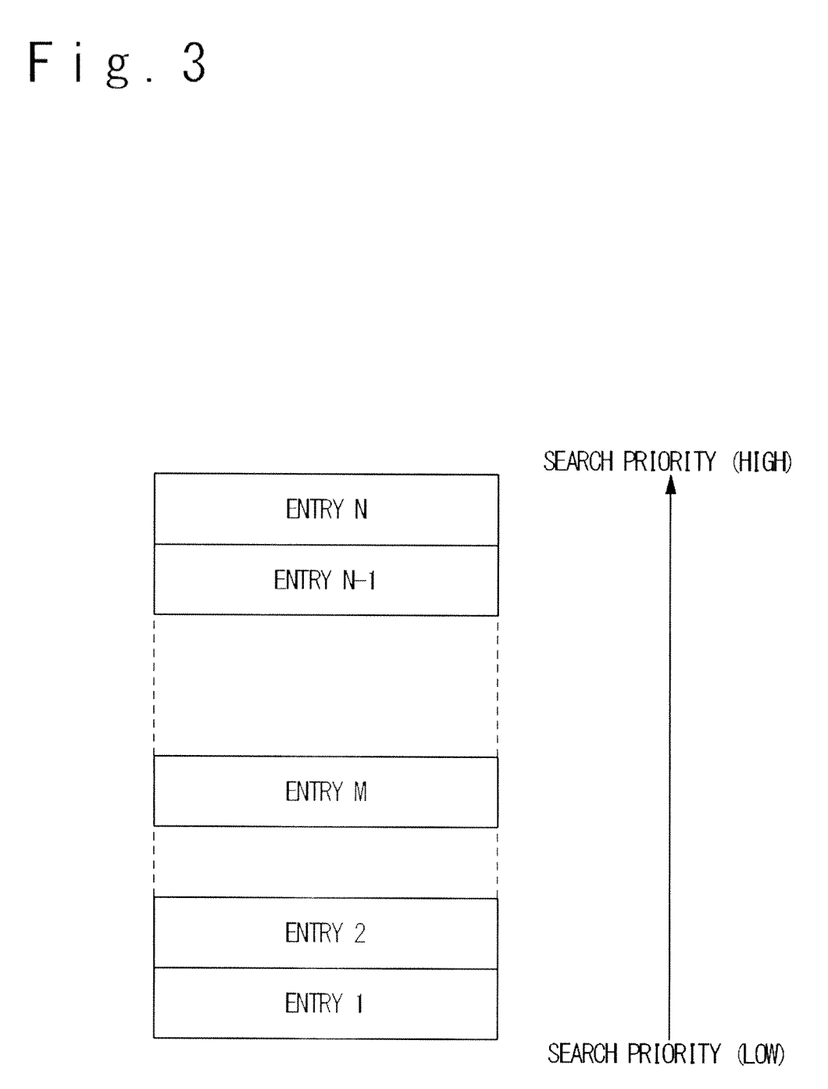
FIG. 3 shows an example of a forwarding table having entries aligned in order of search priority.

A forwarding table controlled by the OpenFlow Protocol in Non-Patent Literature 1, as shown in FIG. 3, has search priorities. Even when a traffic matches search information on an entry with a low search priority, if it matches search information on an entry with a higher search priority, it is forwarded in accordance with the entry with the higher search priority.

Moreover, for example, the case where an entry of the forwarding table is registered onto each of the communication devices 102 in such a manner as to trace a communication path in reversed order starting from a communication device 102 located near a traffic-receiving terminal side will be described.

Referring to FIG. 1 as an example, entries of communication tables are registered in order of communication devices 102D, 102B, and 102A. However, assume that in the forwarding table of the communication device 102B, an entry of the forwarding table containing search information on an entry to be newly registered is registered with a higher search priority than that of the entry to be newly registered. In this case, in the communication device 102B, even when an new entry with a low search priority has been registered as search information with its output destination defined as the communication device 102D, the newly registered entry is not used as a traffic search result, and thus when an entry is registered in the communication device 102A with its output destination defined as the communication device 102B, a traffic matching condition is consequently repeatedly reciprocated between the communication device 102A and the communication device 102B.

For example, assume that in a forwarding table of the communication device 102B, an entry related to a traffic destined to the IP address "192.168.0.0/8" is registered with a higher search priority than that of an entry to be newly registered. In this case, even when in the communication device 102B, as search information, a new entry, in which a packet having a destination IP address "192.168.0.1/32" as header information is outputted to the communication device 102D with a low search priority, is registered, the newly registered entry is not used as a traffic search result. Thus, when in the communication device 102A, as search information, an entry, in which a packet having the destination IP address "192.168.0.1/32" as header information is outputted to the communication device 102B, is registered, a traffic matching the condition is repeatedly reciprocated between the communication device 102A and the communication device 102B.

CITATION LIST

Patent Literature

[PTL 1] US 2006/0092974 A1

Non Patent Literature

[NPL 1] OpenFlow Switch Specification Version 0.9.0 (Wire Protocol 0x98) Jul. 20, 2009 Current Maintainer: Brandon Heller (brandonh@standford.edu)<http://www.openflow-switch.org/documents/openflow-spec-v0.9.0.pdf>

SUMMARY OF INVENTION

An object of the present invention is to solve the conventional problem and to suppress inconsistency of states between communication devices and occurrence of a traffic loop and discard when a control server registers, rewrites and deletes an entry or the like of a forwarding table of the communication device.

A communication control system according to the present invention includes: a plurality of communication devices; and a control server. Each of the plurality of communication devices performs matching of a received traffic and an entry registered in a forwarding table, and when information contained in the traffic and information contained in the entry match each other, forwards the traffic to a route defined in the entry. The control server registers an entry in a forwarding table included in the each of the plurality of communication devices, and determines route information for each communication device. Here, the each communication device verifies, for a sequence of control instructions from the control server, contents of the control instructions from the control server and holds a verification result. In addition, the control sever acquires the verification result from the each communication device, determines whether a sequence of control can be executed by the each communication device based on the verification result from the each communication device, and, if the sequence of control can be executed, invokes the each communication device to execute the sequence of control. Incidentally, the communication device and the control server are assumed to be computing machines.

In a communication control method according to the present invention, a control server registers an entry in a forwarding table included in each of a plurality of communication devices, and determines route information for each of the plurality of communication devices. The each of the plurality of communication devices performs matching of a received traffic and an entry registered in a forwarding table, and when information contained in the traffic and information contained in the entry match each other, forwards the traffic to a route defined in the entry. Here, the each communication device verifies, for a sequence of control instructions from the control server, contents of the control instructions from the control server and holds a verification result. In addition, the control sever acquires the verification result from the each communication device, determines whether a sequence of control can be executed by the each communication device based on the verification result from the each communication device, and, if the sequence of control can be executed, invokes the each communication device to execute the sequence of control.

A program according to the present invention is a program for making computing machines, which respectively function as a communication device and a control server, execute the above communication control method. Here, the program according to the present invention can be stored in a memory device and a memory medium.

In the communication control system separately provided with a communication device forwarding a packet and a control server determining route information, a reliability of communication can be improved.

DESCRIPTION OF EXEMPLARY EMBODIMENTS

First Exemplary Embodiment

Hereinafter, a first exemplary embodiment of the present invention will be described referring to the accompanying drawings.

(Configuration of Network System)

FIG. 1 shows a configuration example of a network system in which the present invention is carried out.

This network system includes: a control server 101, communication devices 102 and terminals 103. Here, communication devices 102A to 102D are shown as the communication devices 102. In addition, terminals 103A and 103B are shown as the terminals 103.

The control server 101 calculates a communication route between ends of the terminals 103 based on topology (connection state) configuration information collected from the communication devices 102, and registers into forwarding tables of the communication devices 102 entries for forwarding a traffic between the terminals 103. Moreover, the control server 101, based on a route change such as a change in the topology configuration information or a change in a usable band, performs, for example, rewriting and deletion of entries of the forwarding tables of the communication devices 102.

The communication devices 102 (communication devices 102A to 102D) form a network topology, and forwards a traffic between ends of the network. The forwarding table of the communication device 102 includes entries each of which specifies search information on a traffic flowing through the network and a destination of a traffic corresponding to the information, and is controlled by the control server 101.

The terminals 103 (terminals 103A and 103B) transmit and receive the traffic between the ends.

(Hardware Example)

As an example of the control server 101, a computing machine such as a PC (personal computer), a thin client server, an appliance, a work station, a main frame, or a super computer is assumed.

As an example of the communication device 102, an Open Flow switch is assumed. Possible examples of a device usable as the Open Flow switch include: relay devices such as a router and a switching hub; and relay computing machines such as a gateway, a proxy, a firewall and a road balancer. For example, the communication device 102 may be a multi-layer switch. The multi-layer switch is further strictly divided into respective layers of the OSI reference model by which the switch is supported. Main categories include: a layer 3 switch that reads data of a network layer (third layer); a layer 4 switch that reads data of a transport layer (fourth layer); and a layer 7 switch (application switch) that reads data of an application layer (seventh layer).

Possible examples of the terminal 103 include: computing machines such as a PC, a thin client terminal, an appliance, a work station, a main frame, and a super computer; a cellular phone; a car navigation system; a gadget (electronic device); a portable game device; a home-use game machine; an interactive television; a digital tuner; a digital recorder; an information home appliance; and an OA (Office Automation) device. The terminal 103 may be mounted on a mobile object such as a vehicle, a vessel, or an aircraft.

Note that the control server 101, the communication devices 102, and the terminals 103 may be virtual machines (VM) constructed on physical machines.

Examples of the network connecting together the control server 101, the communication devices 102, and the terminals 103 include: the Internet; a LAN (Local Area Network), a wireless LAN; a WAN (Wide Area Network); a backbone, a cable TV (CATV) line; a fixed-line phone network, a cellular phone network, the WiMAX (IEEE 802 16a), the 3G (3rd Generation); a lease line; the IrDA (Infrared Data Association); the Bluetooth (registered trademark); a serial communication line, a data bus and so on.

Note that it is actually not limited to these examples.

(Configuration of Communication Device)

Figure 2:
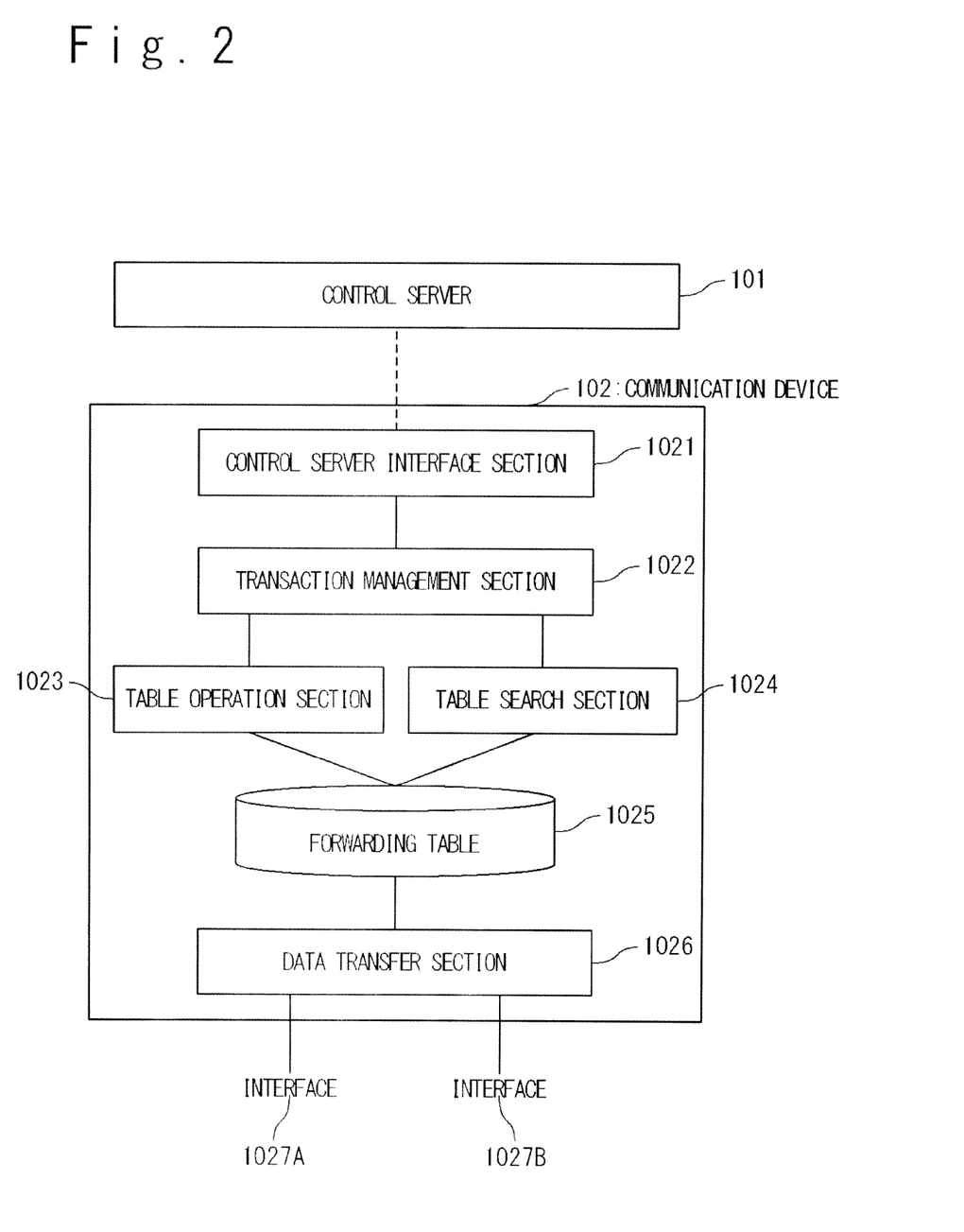
FIG. 2 is a diagram showing a configuration example of a communication device.

FIG. 2 shows a configuration example of the communication device 102.

The communication device 102 includes: a control server interface section 1021, a transaction management section 1022, a table operation section 1023, a table search section 1024, a forwarding table 1025, a data forwarding section 1026, and interfaces 1027. Here, interfaces 1027A and 1027B are shown as the interfaces 1027.

The control server interface section 1021 terminates a control channel with the control server 101, takes out a control command from the control server 101, returns execution results, and accepts and returns an inquiry for transaction results. The transaction is one processing unit obtained by collecting a plurality of related pieces of processing. Possible examples of this control command include a message "FlowMod" which is one of OpenFlow protocol messages and which is provided for registering an entry from a controller into a flow table of a switch.

The transaction management section 1022 holds each control command as a transaction, holds its execution result and a verification result for its command, responds to an inquiry from the control server 101, and executes a transaction in response to an execution command for the transaction. For a method of executing a transaction which is waiting for execution, a widely used 2-phase commit method can be used.

The table operation section 1023 is a block that executes entry registration, rewriting, and deletion on the forwarding table 1025.

The table search section 1024, based on a command from the transaction management section 1022, checks for an already registered entry of the forwarding table 1025 whether or not a new entry has inclusion relationship or partial inclusion relationship and whether the entry having inclusion or partial inclusion relationship has a high or low search priority over the aforementioned entry, and returns their results to the transaction management section 1022.

Figure 4:
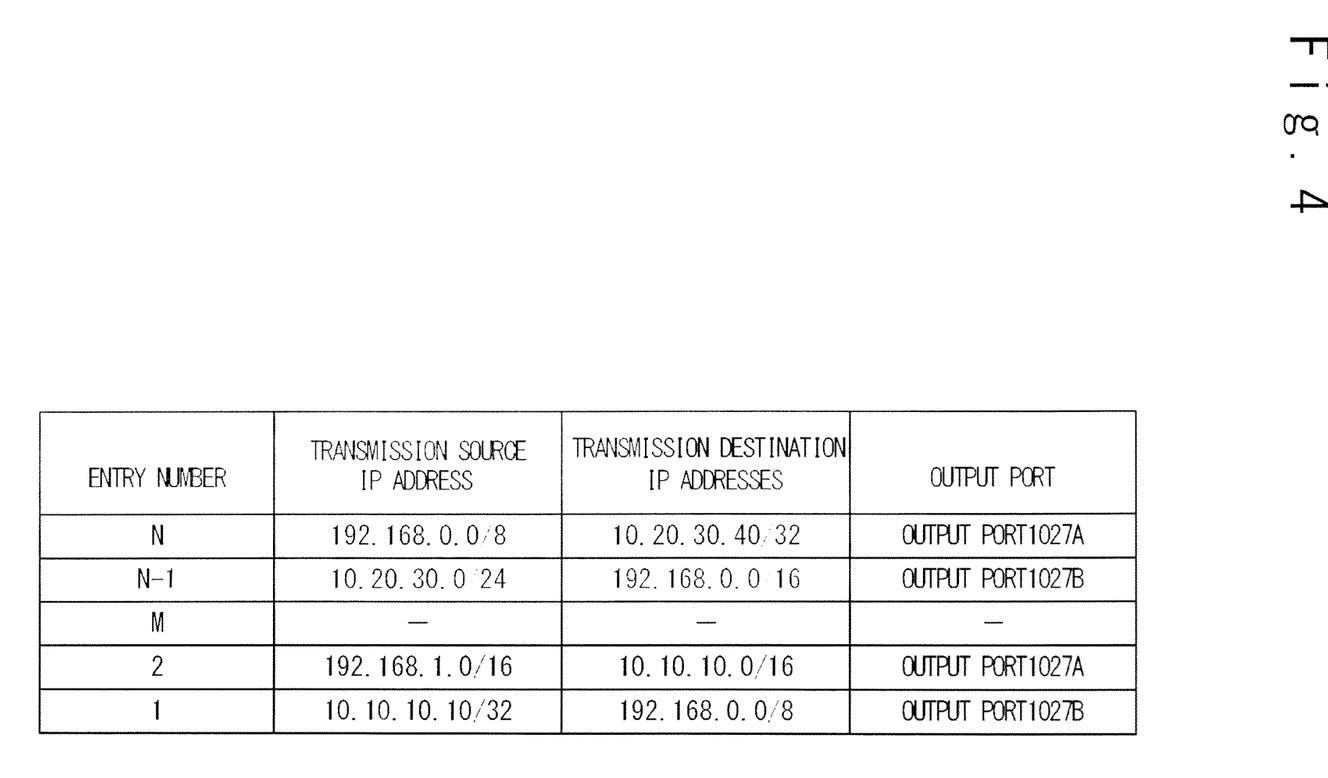
FIG. 4 is a diagram showing a configuration example of the forwarding table.

In the forwarding table 1025, as shown in FIG. 3, the entries are managed by using numbers and their search priorities are determined in order of these numbers, and has search information as shown in FIG. 4 (for example, transmission source and transmission destination IP addresses) and information on an output port, etc. Here, the forwarding table 1025 has: the entry numbers, the transmission source IP addresses, the transmission destination IP addresses, and the information on the output port. The output port denotes the interfaces 1027 (interfaces 1027A and 1027B).

The data forwarding section 1026 extracts a search key from a traffic inputted from the interfaces 1027 (interfaces 1027A and 1027B), executes searching the forwarding table 1025 for the search key, and forwards the traffic based on the result of this search.

The interfaces 1027 (interfaces 1027A and 1027B) are interfaces for communication of the communication devices 102, make connection with the different communication device 102 and terminal 103 as shown in FIG. 1, and perform traffic reception and transmission.

Here, the control server interface section 1021, the transaction management section 1022, the table operation section 1023, the table search section 1024, the forwarding table 1025, and the data forwarding section 1026 are realized by hardware such as a processor that is driven by a program, software such as a program that drives the hardware to cause execution of predetermined processing, and a storage device that stores the software and various pieces of data. Note that they are not limited to these examples.

Examples of the processor described above include: a CPU (Central Processing Unit), a microprocessor, a microcontroller, and a semiconductor integrated circuit (IC) having the same function. Note that it is not limited to these examples.

Examples of the storage device described above include: semiconductor storage devices such as an RAM (Random Access Memory), a ROM (Read Only Memory), an EEPROM (Electrically Erasable and Programmable Read Only Memory), and a flash memory; auxiliary storage devices such as an HDD (Hard Disk Drive) and an SSD (Solid State Drive); and removable discs or recording media such as a DVD (Digital Versatile Disk) and an SD memory card (Secure Digital memory card). Note that it is actually not limited to these examples.

Moreover, the control server interface section 1021, the data forwarding section 1026 and the interfaces 1027 have a communication function. Examples of the hardware realizing the communication function of the control server interface section 1021, the data forwarding section 1026, and the interfaces 1027 include: a network adaptor such as an NIC (Network Interface Card); a communication device such as an antenna; and a communication port such as a connection port (connector). Note that it is actually not limited to these examples.

(Operation Upon Entry Registration to Forwarding Table (with a Standby))

Figure 6:
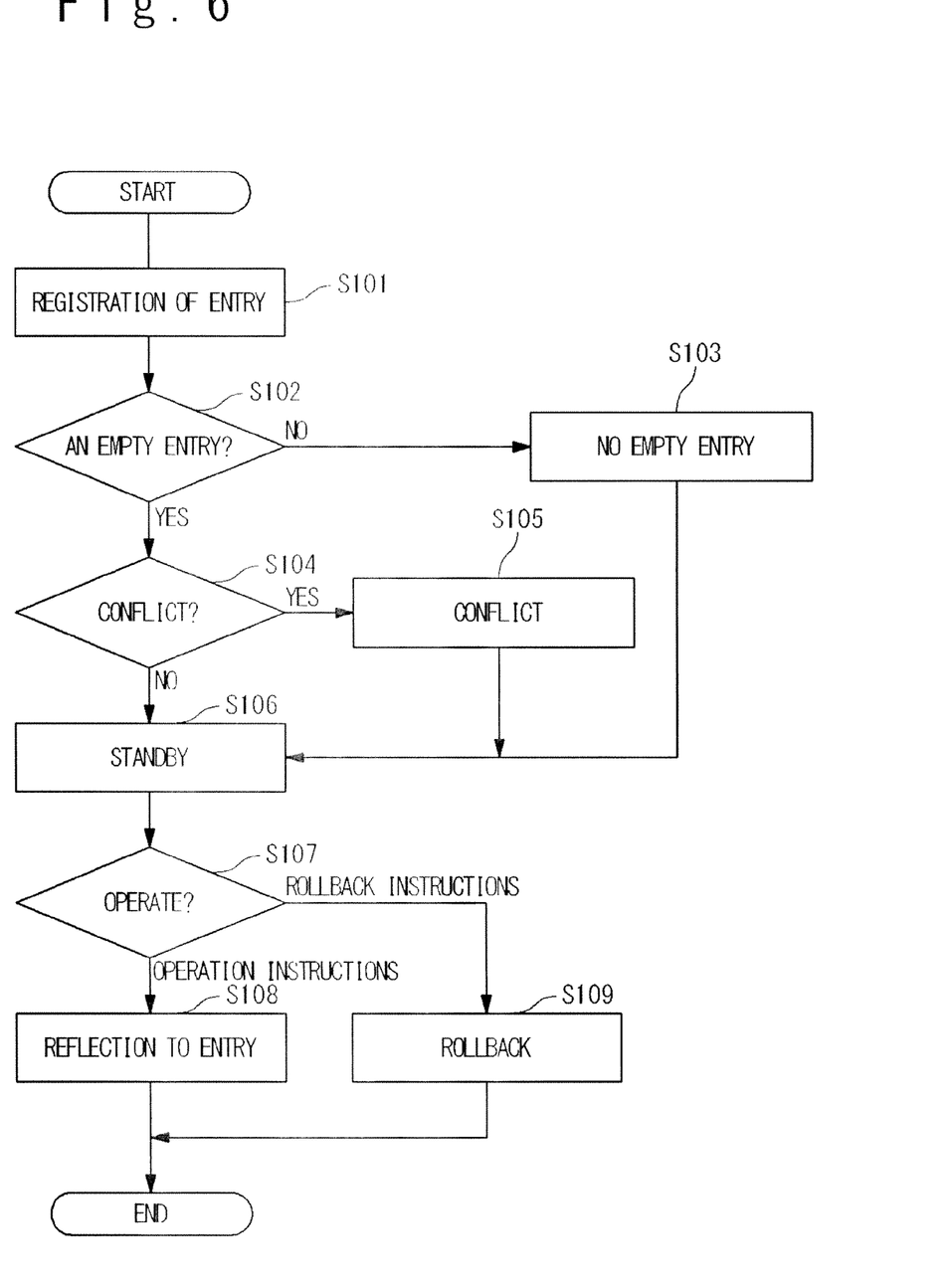
FIG. 6 is a flowchart showing operation performed upon entry registration to the forwarding table (with a standby)

Referring to FIG. 6, operation for keeping consistency of the communication route will be described.

Here, the control server 101 transmits entry data in a format of FIG. 4 to the communication device 102. The communication device 102 stores the received entry data into the forwarding table 1025.

(1) Step S101

Figure 5:
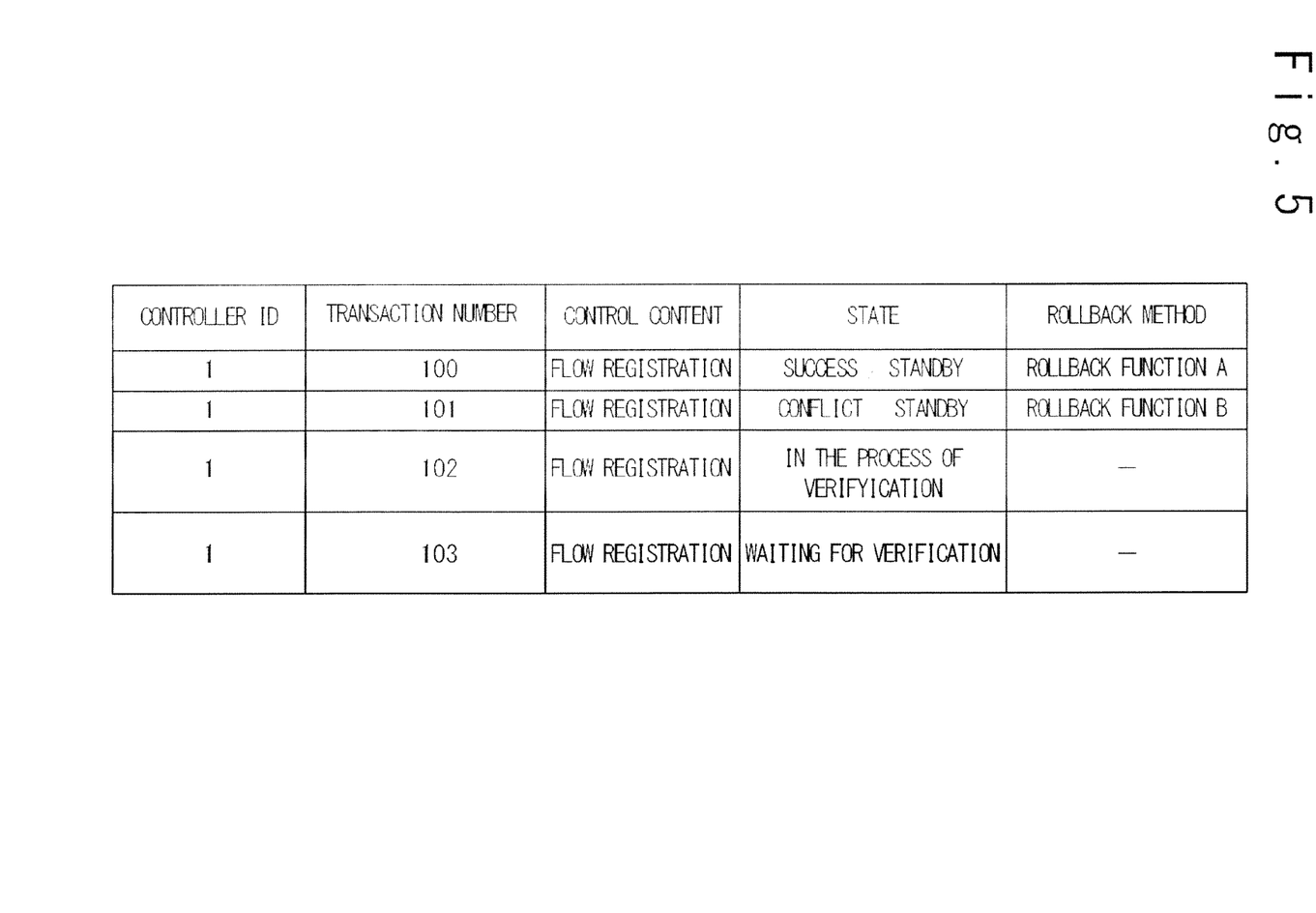
FIG. 5 is a diagram showing a configuration example of a transaction state table.

In the communication device 102, the control server interface section 1021 receives a control command for new entry addition instructions from the control server 101 via a control channel, and passes it over to the transaction management section 1022. The transaction management section 1022, with a transaction number included in the control command, as a key, registers a state as Waiting For Verification into a transaction state table of FIG. 5. Here, the transaction state table has information on a controller ID, a transaction number, a control command, a state and a rollback method. The controller ID is identification information on the control server. In the case where there is only one control server 101 which can be uniquely specified, the information on the controller ID is not required. The transaction of Waiting For Verification in the transaction state table is changed to an In The Process Of Verification state and the entry of the forwarding table 1025 is transmitted to the table search section 1024.

(2) Step S102

The table search section 1024, referring to the forwarding table 1025, checks whether or not there is any empty entry in the forwarding table 1025. If there is any empty entry, the table search section 1024 proceeds to processing of step S104. Moreover, if there is no empty entry, the table search section 1024 proceeds to processing of step S103.

(3) Step S103

If there is no empty entry, the table search section 1024 notifies the transaction management section 1022 that the forwarding table 1025 has no empty entry. The transaction management section 1022, defining the state as No Empty Entry, proceeds to processing of step S106 to set the transaction at a standby state.

(4) Step S104

If there is any empty entry, the table search section 1024 checks whether or not there is any entry having inclusion relationship or partial inclusion relationship (there is conflict) in the forwarding table 1025. If there is any entry having the inclusion relationship or the partial inclusion relationship (there is conflict), the table search section 1024 checks the priority of this entry. If there is any entry having the inclusion relationship or the partial inclusion relationship (there is conflict), the table search section 1024 proceeds to processing of step S105. Moreover, if there is no entry having the inclusion relationship or the partial inclusion relationship (there in no conflict), the table search section 1024 proceeds to processing of step S106 to set the transaction at a standby state.

(5) Step S105

If there is any entry having the inclusion relationship or the partial inclusion relationship (there is conflict), the table search section 1024 notifies the transaction management section 1022 that there is an entry having the inclusion relationship or the partial inclusion relationship (there is conflict). The transaction management section 1022, setting the state as Inclusion/Partial Inclusion Relationship (Conflict), proceeds to the processing of step S106 to set the transaction at a standby state.

(6) Step S106

The table search section 1024, turning the transaction to a standby state, waits for instructions from the control server 101. The control server 101 automatically checks the result of processing verification with the transaction number defined as a key and performs judgment based on the result in the control server 101. At this point, it is possible to notify completion of the transaction from the communication device 102 to the control server 101.

(7) Step S107

The control server interface section 1021 receives a new control command from the control server 101 via the control channel and passes it over to the transaction management section 1022. The control server interface section 1021 performs processing based on the control command from the control server 101. If the control command is processing execution, the operation proceeds to processing of step S108. If the control command is rollback instructions, the operation proceeds to processing of step S109.

(8) Step S108

If the control command is the processing execution, the control server interface section 1021 reflects the entry onto the forwarding table 1025 based on the control command from the control server 101.

(9) Step S109

If the control command is the rollback instructions, the control server interface section 1021 does not reflect the entry onto the forwarding table 1025 and performs processing in accordance with a registered rollback function, based on the control command from the control server 101.

Second Exemplary Embodiment

In the present exemplary embodiment, in step S106 and step S107 of FIG. 6, the transaction number is not provided as an INDEX of control, but the entry of the forwarding table 1025 is provided as the INDEX of the control.

The entry of the forwarding table is search information such as an IP address. The presence of the same search information makes it difficult to perfume identification, and thus it is preferable that information which is not overlapped with others is used for the entry (search information) of the forwarding table.

This makes it possible to omit the transaction number.

Third Exemplary Embodiment

Figure 7:
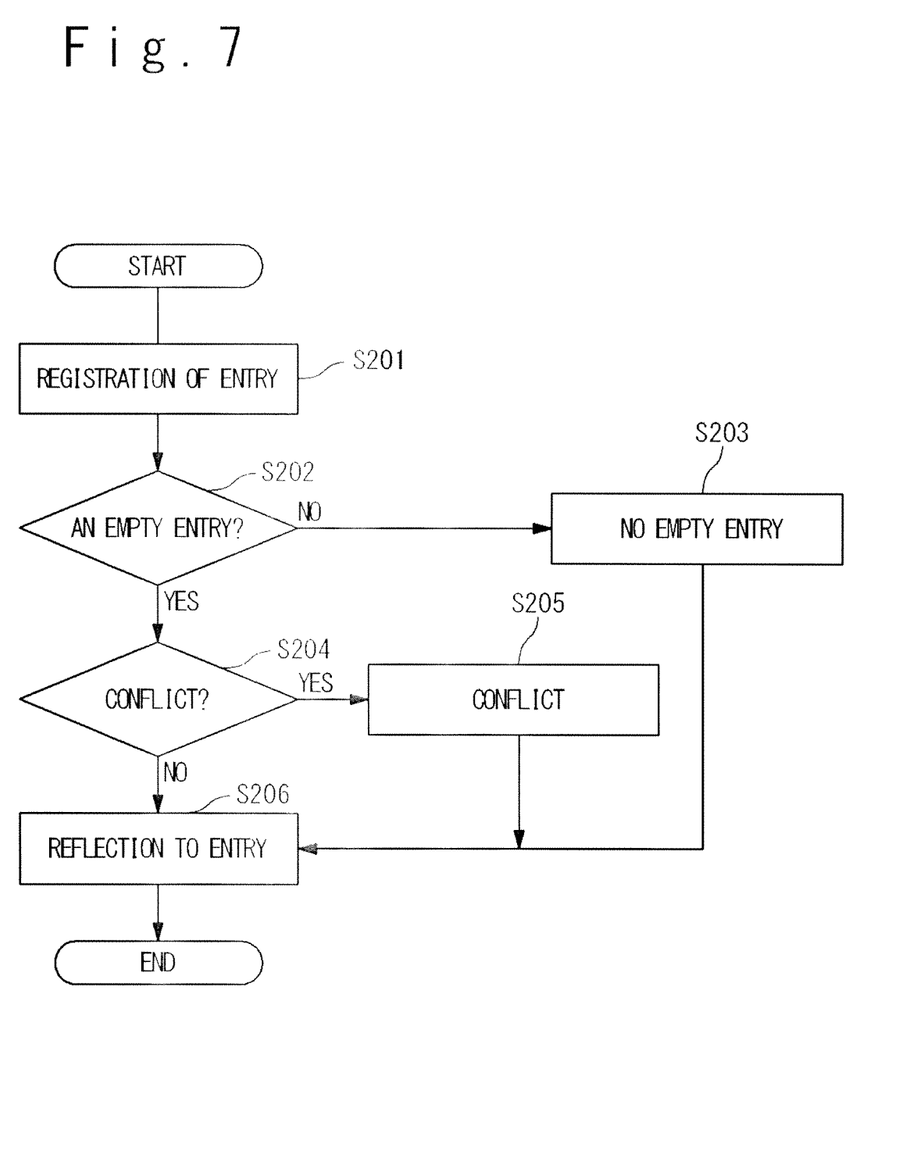
FIG. 7 is a flowchart showing operation performed upon entry registration to the forwarding table (without a standby)

In the present exemplary embodiment, as shown in FIG. 7, if there is no empty entry or there is no entry having inclusion relationship or partial inclusion relationship (there is no conflict), the transaction management section 1022 is not on standby for the processing, but directly executes the control command. In this case, as a result of the execution, a result of processing verification can be checked and it is also possible to perform rollback.

(Operation Upon Entry Registration to Forwarding Table (without a Standby)

Referring to FIG. 7, operation for keeping consistency of a communication route in the present exemplary embodiment will be described. Note that steps S201 to S205 of FIG. 7 are the same as steps S101 to S105 of FIG. 6.

(1) Step S201

In the communication device 102, the control server interface section 1021 receives a control command for new entry addition instruction from the control server 101 via the control channel, and passes it over to the transaction management section 1022. The transaction management section 1022, with the transaction number included in the control command, as a key, registers a state as Waiting For Verification into the transaction state table of FIG. 5. The transaction of Waiting For Verification in the transaction state table is changed to an In The Process Of Verification state and the entry of the forwarding table is transmitted to the table search section 1024.

(2) Step S202

The table search section 1024, referring to the forwarding table 1025, checks whether or not there is any empty entry in the forwarding table 1025. If there is any empty entry, the table search section 1024 proceeds to processing of step S204. In addition, if there is no empty entry, the table search section 1024 proceeds to processing of step S203.

(3) Step S203

If there is no empty entry, the table search section 1024 notifies the transaction management section 1022 that there is no empty entry in the forwarding table 1025. The transaction management section 1022 turns the state to No Empty Entry and proceeds to processing of step S206.

(4) Step S204

If there is any empty entry, the table search section 1024 checks whether or not there is any entry having inclusion relationship or partial inclusion relationship (there is conflict) in the forwarding table 1025. If there is any entry having inclusion relationship or partial inclusion relationship (there is conflict), the table search section 1024 also checks the priority of this entry. If there is any entry having inclusion relationship or partial inclusion relationship (there is conflict), the table search section 1024 proceeds to processing of step S205. If there is no entry having inclusion relationship or partial inclusion relationship (there is conflict), the table search section 1024 proceeds to processing of step S206.

(5) Step S205

If there is any entry having inclusion relationship or partial inclusion relationship (there is conflict), the table search section 1024 notifies the transaction management section 1022 that there is an entry having inclusion relationship or partial inclusion relationship (there is conflict). The transaction management section 1022, setting the state as Inclusion/Partial Inclusion Relationship (Conflict), proceeds to the processing of step S206.

(6) Step S206

The control server interface section 1021 performs processing based on the control command from the control server 101. If the control command is processing execution, the control server interface section 1021 reflects the entry onto the forwarding table 1025 based on the control command from the control server 101. In addition, if the control command is rollback instructions, the control server interface section 1021 does not reflect the entry onto the forwarding table 1025 and performs processing in accordance with a registered rollback function, based on the control command from the control server 101. The control server 101 checks the result of the processing verification with the transaction number defined as a key, and performs judgment in the control server 101 based on this result. At this point, it is also possible to notify completion of the transaction from the communication device 102 to the control server 101.

Fourth Exemplary Embodiment

Figure 8:
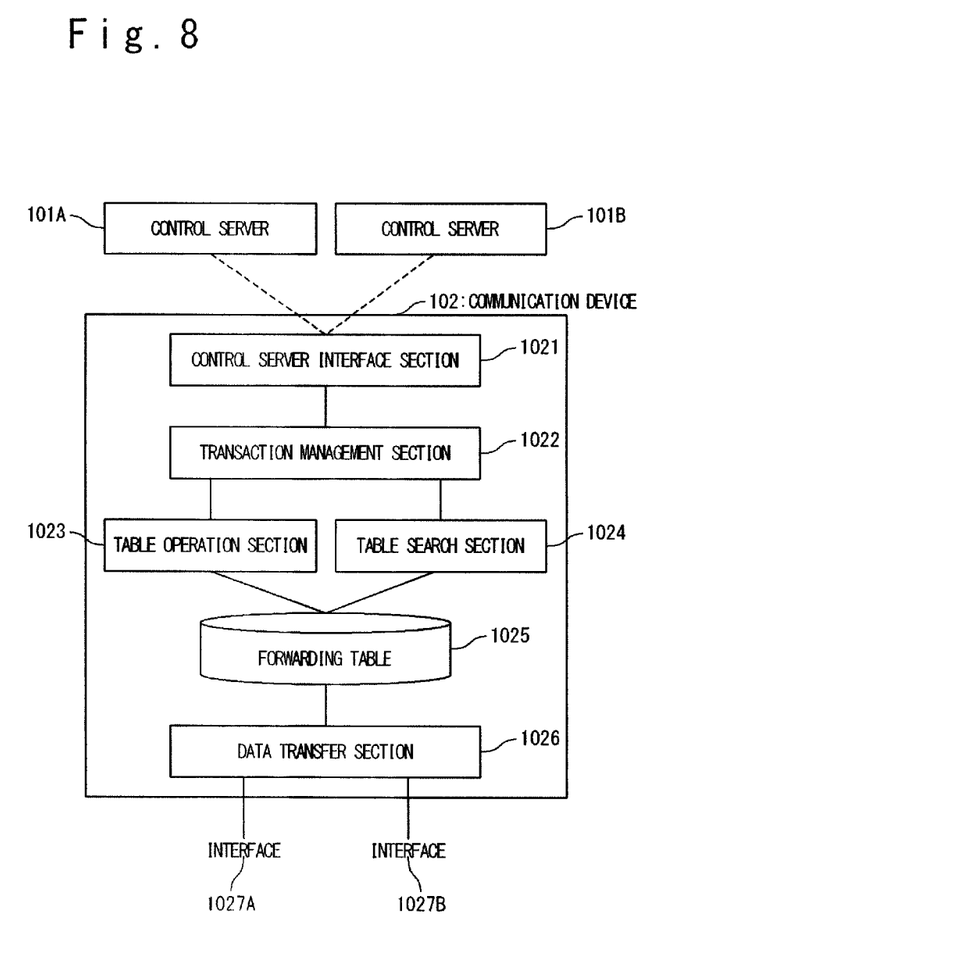
FIG. 8 is a diagram showing a configuration example of a communication device in a network having a plurality of control servers.
Figure 9:
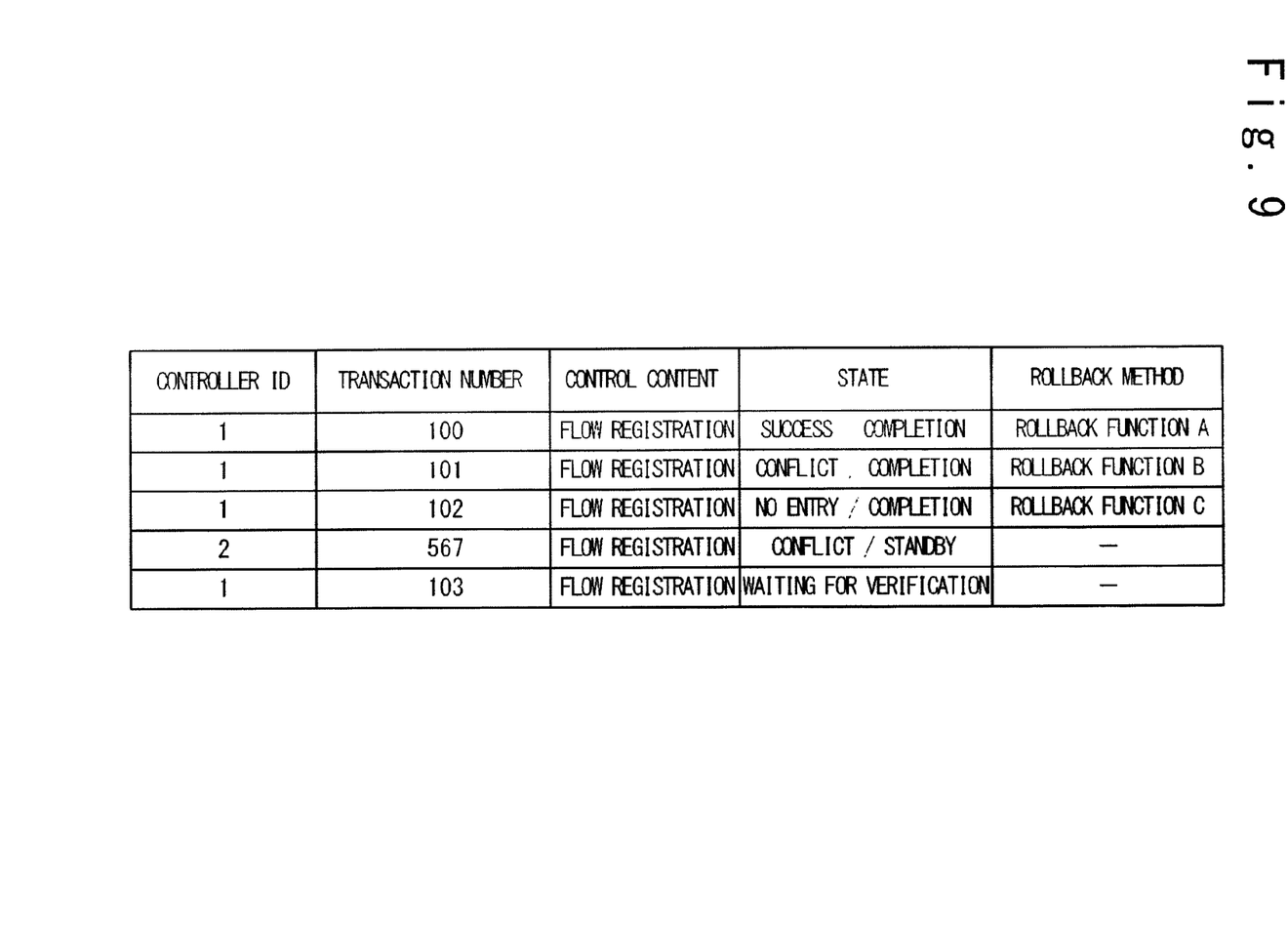
FIG. 9 is a diagram showing a configuration example of a transaction state table in the network having the plurality of control servers.

In the present exemplary embodiment, as shown in FIG. 8, the communication device 102 receives control from a plurality of control servers 101 (control servers 101A, 101B). In this case, a transaction state table as shown in FIG. 9 is provided. In the present exemplary embodiment, the transaction is managed by using a pair of "a controller ID" and "a transaction number". The controller ID is identification information on the control server. Here, the controller ID of the control server 101A is defined as "1", and the controller ID of the control server 101B is defined as "2".

Fifth Exemplary Embodiment

In the present exemplary embodiment, for any transaction for which the control server 101 serves as an initiator, a number originally generated by the control server 101 is used as a transaction number, and for any transaction for which the communication device 102 serves as an initiator, a number originally generated by the communication device 102 is used as the transaction number. Examples of the transaction for which the communication device 102 serves as an initiator include a change in a state of the interface and a transaction for which traffic reception is notified to the control server 101, etc.

Sixth Exemplary Embodiment

In the present exemplary embodiment, since the control server 101 controls a plurality of communication device groups 102, both transaction for which the control server 101 serves as an initiator and transaction for which the communication device 102 serves as an initiator are managed in the control server 101 by a pair of the communication device 102 and the transaction number.

Seventh Exemplary Embodiment

In the present exemplary embodiment, the communication device 102 originally generates a transaction number, and when the ID of the communication device 102 has been changed or when the control server 101 as a connection destination has been changed, newly rolls a transaction number. At this point, a random number is used as the transaction number.

Eighth Exemplary Embodiment

In the present exemplary embodiment, when there is a plurality of pieces of processing for executing the identical transaction, the communication device 102 performs the processing in accordance with order of the plurality of processing.

ADDITIONAL DESCRIPTION

Note that the exemplary embodiments described above can also be carried out in combination.

SUMMARY

As described above, the present invention relates to a control method of a communication device, in a communication system controlling, for example, admission, a route and QoS of a traffic between terminals by adding, rewriting and deleting a forwarding table of a communication device from a control server separated from the communication device, the control method being provided for ensuring communication connection performance between the terminals by performing operation on a forwarding table of a plurality of communication devices with keeping consistency.

The object of the present invention is, when registration, rewriting and deletion of an entry or the like of the forwarding table of the communication device are performed from the control server, to suppress a state inconsistency between the communication devices and avoid unintended traffic loop and discard thereby improving communication reliability.

With the method of the present invention, for control instructions such as the registration, the rewriting and the deletion of the entry of the forwarding table and the control of UP/DOWN of the interface which are performed on the communication device 102 by the control server 101 and, the communication device 102 verifies contents of the control instructions from the control server 101, the communication device 102 holds the result of this verification, the control server 101 acquires the result of the verification, the control server 101 judges whether or not a series of controls can be executed based on the results of the verification from the plurality of communication devices 102, and then the control server 101 invokes the execution at the plurality of communication devices 102.

Alternatively, in accordance with instructions from the control server 101, the communication device 102 once executes the instructions, and upon judgment that the control command is abnormal, the control server 101 performs the rollback of the result of the execution to the communication device 102.

While the exemplary embodiments of the present invention have been described above, the present invention is not limited to the exemplary embodiments described above in practice and modifications not departing from the spirits of the present invention are also included in the present invention.

This application is based upon and claims the benefit of priority from Japanese patent application No. JP2010-001292, the disclosure of Japanese patent application No. JP2010-001292 is incorporated herein in its entirety by reference.

The invention claimed is:

1. A communication control system, comprising:
a plurality of communication devices, each of said plurality of communication devices configured to perform matching of a received traffic and an entry registered in a forwarding table, and, when information contained in said traffic and information contained in said entry match each other, forward said traffic to a route defined in said entry; and
a control server configured to register an entry in a forwarding table included in said each of said plurality of communication devices, and determine route information for said each communication device,
wherein said each communication device verifies, for a sequence of control instructions from said control server, contents of said control instructions from said control server and holds a verification result,
wherein said control server acquires said verification result from said each communication device, determines whether a sequence of control can be executed by said each communication device based on said verification result from said each communication device, and, if said sequence of control can be executed, invokes said each communication device to execute said sequence of control,
wherein, when said each communication device receives a control command for new entry addition instructions to said forwarding table from said control server,
with reference to said forwarding table, said each communication device checks whether or not there is any empty entry in said forwarding table,
if there is any empty entry, said each communication device checks whether or not there is any entry having an inclusion relationship or a partial inclusion relationship in said forwarding table,
if there is any entry having said inclusion relationship or said partial inclusion relationship, said each communication device checks a priority of said entry and performs said control command from said control server, and
wherein the communication devices and the control server are implemented as a hardware component.

2. The communication control system according to claim 1, wherein, for said sequence of control instructions from said control server, said each communication device once executes said sequence of control, and
wherein, when said control server judges that said contents of said control instructions from said control server is abnormal, and invokes an execution of a rollback of said execution result to said each communication device.

3. The communication control system according to claim 1, wherein, if there is no empty entry or if said each communication device checks whether or not there is any entry having inclusion relationship or partial inclusion relationship, said each communication device sets a sequence of control at a standby state to wait for instructions from said control server, and receives a new control command from said control server,
wherein, if said new control command is processing execution, said each communication device adds an entry to said forwarding table based on said control command from said control server, and wherein, if said new control command comprise rollback instructions, said each communication device does not add an entry to said forwarding table and performs processing in accordance with a rollback function based on said control command from said control server.

4. A communication device in a communication control system, wherein said communication control system includes a plurality of communication devices, and a control server configured to register an entry in a forwarding table included in each of said plurality of communication devices, and to determine route information for said each of said plurality of communication devices, wherein said communication device is any of said plurality of communication devices, said communication device comprising:
a data forwarding section configured to perform matching of a received traffic and an entry registered in a forwarding table, and, when information contained in said traffic and information contained in said entry match each other, forward said traffic to a route defined in said entry;
a transaction management section configured to verify, for a sequence of control instructions from said control server, contents of said control instructions from said control server and hold a verification result, wherein said control server acquires said verification result from said each communication device, determines whether a sequence of control can be executed by said each communication device based on said verification result from said each communication device, and, if said sequence of control can be executed, invokes said each communication device to execute said sequence of control; and
a table search section configured to, when said communication device receives a control command for new entry addition instructions to said forwarding table from said control server, with reference to said forwarding table, check whether or not there is any empty entry in said forwarding table,
wherein, if there is any empty entry, said table search section checks whether or not there is any entry having an inclusion relationship or a partial inclusion relationship in said forwarding table,
wherein, if there is any entry having said inclusion relationship or said partial inclusion relationship, said table search section checks a priority of said entry and performs said control command from said control server, and
wherein the communication device, the communication devices and the control server are implemented as a hardware component.

5. The communication device according to claim 4, further comprising:
a control server interface section configured to, for said sequence of control instructions from said control server, once execute said sequence of control,
wherein, when said control server judges that said contents of said control instructions from said control server is abnormal, and invokes execution of a rollback of said execution result to said each communication device.

6. The communication device according to claim 4, wherein, if there is no empty entry or if said table search section checks whether or not there is any entry having inclusion relationship or partial inclusion relationship, said table search section sets a sequence of control at a standby state to wait for instructions from said control server, said communication device further comprising:
a control server interface section configured to receive a new control command from said control server,
wherein, if said new control command comprise processing execution, said control server interface section adds an entry to said forwarding table based on said control command from said control server, and
wherein, if said new control command comprise rollback instructions, said control server interface section does not add an entry to said forwarding table and performs processing in accordance with a rollback function based on said control command from said control server.

7. A communication control method, comprising:
a control server registering an entry in a forwarding table included in each of a plurality of communication devices and determining route information for each of said plurality of communication devices;
said each of said plurality of communication devices performing matching of a received traffic and an entry registered in a forwarding table, and when information contained in said traffic and information contained in said entry match each other, forwarding said traffic to a route defined in said entry;
said each communication device, for a sequence of control instructions from said control server, verifying contents of said control instructions from said control server and holding a verification result;
said control server acquiring said verification result from said each communication device, determining whether a sequence of control can be executed by said each communication device based on said verification result from the each communication device, and, if said sequence of control can be executed, invoking said each communication device to execute said sequence of control;
said each communication device, when said each communication device receives a control command for new entry addition instructions to said forwarding table from said control server, checking whether or not there is any empty entry in said forwarding table, with reference to said forwarding table;
said each communication device, if there is any empty entry, checking whether or not there is any entry having an inclusion relationship or a partial inclusion relationship in said forwarding table;
said each communication device, if there is any entry having said inclusion relationship or said partial inclusion relationship, checking a priority of said entry; and
said each communication device performing said control command from said control server.

8. The communication control method according to claim 7, further comprising:
said each communication device, for said sequence of control instructions from said control server, once executing said sequence of control; and
said control server invoking execution of a rollback of said execution result to said each communication device, when said control server judges that said contents of said control instructions from said control server is abnormal.

9. The communication control method according to claim 7, further comprising:
said each communication device, if there is no empty entry or if said each communication device checks whether or not there is any entry having inclusion relationship or partial inclusion relationship, setting a sequence of control at a standby state to wait for a instructions from said control server;

said each communication device receiving a new control command from said control server;

said each communication device, if said new control command is processing execution, adding an entry to said forwarding table based on said control command from said control server; and said each communication device, if said new control command comprise rollback instructions, not adding an entry to said forwarding table and performing processing in accordance with a rollback function based on said control command from said control server.

10. A recording medium which records a computer program for executing a part of a communication control method by a communication control system composed of a plurality of communication devices and a control server registering an entry in a forwarding table included in each of said plurality of communication devices and determining route information for each of said plurality of communication devices, said computer program comprising code operable to control a computer as each of said plurality of communication devices, the code comprising:

performing matching of a received traffic and an entry registered in a forwarding table, and when information contained in said traffic and information contained in said entry match each other, forwarding said traffic to a route defined in said entry;

for a sequence of control instructions from said control server, verifying contents of said control instructions from said control server and holding a verification result, wherein said control server acquires said verification result from said each communication device, determines whether a sequence of control can be executed by said each communication device based on said verification result from the each communication device, and if said sequence of control can be executed, invokes said each communication device to execute said sequence of control;

when receiving a control command for new entry addition instructions to said forwarding table from said control server, checking whether or not there is any empty entry in said forwarding table, with reference to said forwarding table;

if there is any empty entry, checking whether or not there is any entry having an inclusion relationship or a partial inclusion relationship in said forwarding table;

if there is any entry having said inclusion relationship or said partial inclusion relationship, checking a priority of said entry; and performing said control command from said control server.

11. The recording medium according to claim 10, further comprising:

for said sequence of control instructions from said control server, once executing said sequence of control, wherein said control server invokes an execution of a rollback of said execution result to said each communication device, when said control server judges that said contents of said control instructions from said control server is abnormal.

12. The recording medium according to claim 10, further comprising:

if there is no empty entry or if said each communication device checks whether or not there is any entry having an inclusion relationship or a partial inclusion relationship, setting a sequence of control at a standby state to wait for instructions from said control server;

receiving a new control command from said control server;

if said new control command comprises processing execution, adding an entry to said forwarding table based on said control command from said control server; and if said new control command comprises rollback instructions, not adding an entry to said forwarding table and performing processing in accordance with a rollback function based on said control command from said control server.

* * * * *